(12) United States Patent
Hirayama et al.

(10) Patent No.: US 11,193,537 B2
(45) Date of Patent: Dec. 7, 2021

(54) BEARING MEMBER

(71) Applicant: NISSAN MOTOR CO., LTD., Yokohama (JP)

(72) Inventors: Hayato Hirayama, Kanagawa (JP); Takemichi Yamashita, Kanagawa (JP); Tsuyoshi Higuchi, Kanagawa (JP); Yutaka Mabuchi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/980,000

(22) PCT Filed: Mar. 12, 2018

(86) PCT No.: PCT/JP2018/009442
§ 371 (c)(1),
(2) Date: Sep. 11, 2020

(87) PCT Pub. No.: WO2019/175924
PCT Pub. Date: Sep. 19, 2019

(65) Prior Publication Data
US 2021/0010537 A1 Jan. 14, 2021

(51) Int. Cl.
*F16C 33/24* (2006.01)
*F16C 17/02* (2006.01)
*F16C 33/20* (2006.01)

(52) U.S. Cl.
CPC ............. *F16C 33/24* (2013.01); *F16C 17/02* (2013.01); *F16C 33/206* (2013.01); *F16C 33/208* (2013.01); *F16C 2240/60* (2013.01); *F16C 2360/22* (2013.01)

(58) Field of Classification Search
CPC .......... F16C 9/04; F16C 17/02; F16C 33/128; F16C 33/145; F16C 33/201; F16C 33/206; F16C 33/208; F16C 33/24; F16C 2202/04; F16C 2240/60; F16C 2360/22; F05C 2253/20
See application file for complete search history.

(56) References Cited

U.S. PATENT DOCUMENTS

| 5,328,772 A | 7/1994 | Tanaka et al. |
| 6,272,751 B1 * | 8/2001 | McMeekin ........... F16C 17/026 29/898.054 |
| 6,498,127 B1 * | 12/2002 | Niwa ...................... F16C 33/14 428/550 |

(Continued)

FOREIGN PATENT DOCUMENTS

| JP | 5-39811 A | 2/1993 |
| JP | 7-145816 A | 6/1995 |

(Continued)

*Primary Examiner* — Alan B Waits
(74) *Attorney, Agent, or Firm* — Foley & Lardner LLP

(57) ABSTRACT

A bearing member (B1) having a coating layer (1) on an internal circumferential surface of a shaft hole (H) configured to mount a shaft body (P1), the coating layer (1) having a metal layer (2) whose surface is formed unevenly, and a resin layer (3) formed on the metal layer (2), the metal layer (2) having a part thereof exposed (2A) on a surface of the resin layer (3), to inhibit the increase in temperature caused by sliding contact with the shaft body (P1), and accomplishing improvement in seizure resistance.

18 Claims, 8 Drawing Sheets

(56) References Cited

U.S. PATENT DOCUMENTS

| | | | | |
|---|---|---|---|---|
| 6,548,188 | B1 * | 4/2003 | Yanase | F16C 33/201 |
| | | | | 384/300 |
| 2008/0241515 | A1 | 10/2008 | Tanaka et al. | |
| 2009/0165743 | A1 | 7/2009 | Kemnitz et al. | |
| 2011/0164840 | A1 | 7/2011 | Hayashi et al. | |
| 2014/0141282 | A1 * | 5/2014 | Yamauchi | F16C 33/206 |
| | | | | 428/684 |
| 2016/0091022 | A1 | 3/2016 | Kamiya et al. | |
| 2016/0273583 | A1 * | 9/2016 | Iwata | F16C 33/201 |
| 2019/0186539 | A1 * | 6/2019 | Kurosaki | F16C 33/128 |
| 2020/0016662 | A1 * | 1/2020 | Tamura | F16C 33/104 |

FOREIGN PATENT DOCUMENTS

| | | |
|---|---|---|
| JP | 10-184689 A | 7/1998 |
| JP | 2001-289169 A | 10/2001 |
| JP | 2005-263849 A | 9/2005 |
| JP | 2007-205254 A | 8/2007 |
| JP | 2008-240785 A | 10/2008 |
| JP | 2009-520903 A | 5/2009 |
| JP | 2013-204808 A | 10/2013 |
| JP | 2016-65593 A | 4/2016 |
| WO | WO 2007/076813 A1 | 7/2007 |
| WO | WO 2010/038588 A1 | 4/2010 |
| WO | WO 2014/126202 A1 | 8/2014 |

\* cited by examiner

BEARING MEMBER

TECHNICAL FIELD

The present invention relates to improvement in a bearing member being used as a component for various mechanisms such as a linkage.

BACKGROUND ART

Generally, there are various types of bearing members. In particular, as a bearing member (plain bearing) that frequently undergoes sliding contact against a shaft body, a resin bushing that provides a resin layer on an internal circumferential surface of a shaft hole is well known to achieve improvement in seizure resistance. Such a technique is disclosed in, for example, Patent Document 1. Patent Document 1 relates to a piston of an internal combustion engine. This Patent Document 1 discloses that by coating resin that contains solid lubricant particles on an internal circumferential surface of a boss hole housing a piston pin, durability of a shoe portion of the piston pin is improved.

CITATION LIST

Patent Document

Patent Document 1: JP 2009-520903A

SUMMARY OF INVENTION

Technical Problem

However, with a conventional bearing member as described above, the resin layer has low heat conduction property, and easily becomes high in temperature caused by the sliding contact against the shaft body, thus becoming a so-called heat accumulated state. Hence, an object was to achieve further improvement in seizure resistance against the shaft body.

The present invention is accomplished by focusing on the above conventional object, and aims to provide a bearing member that can inhibit the increase in temperature caused by the sliding contact against the shaft body, and that can accomplish improvement in seizure resistance.

Solution to Problem

A bearing member according to the present invention has a coating layer on an internal circumferential surface of a shaft hole that mounts a shaft body. The coating layer has a metal layer whose surface is formed unevenly, and a resin layer formed on the metal layer. Furthermore, the bearing member has a part of the metal layer exposed in a state flush with the surface of the resin layer, and the metal layer has an exposure rate at an end portion of the shaft hole greater than an exposure rate of the metal layer at a center portion of the shaft hole, in a direction along an axis of the shaft hole.

Advantageous Effects of Invention

By employing the above configuration, the bearing member according to the present invention has the resin layer forming the main surface of the coating layer, which reduces friction resistance against the shaft body, while the metal layer, which has a part exposed on the surface of the resin layer, bears the heat conduction. Accordingly, the bearing member can inhibit the increase in temperature caused by the sliding contact against the shaft body and accomplish improvement in seizure resistance. Particularly, the bearing member can enhance the heat conduction property and inhibit the increase in temperature at both end portions of the shaft hole in which a partial contact is caused, thus allowing seizure to be more efficiently prevented.

DESCRIPTION OF EMBODIMENTS

First Embodiment

Figure 1:
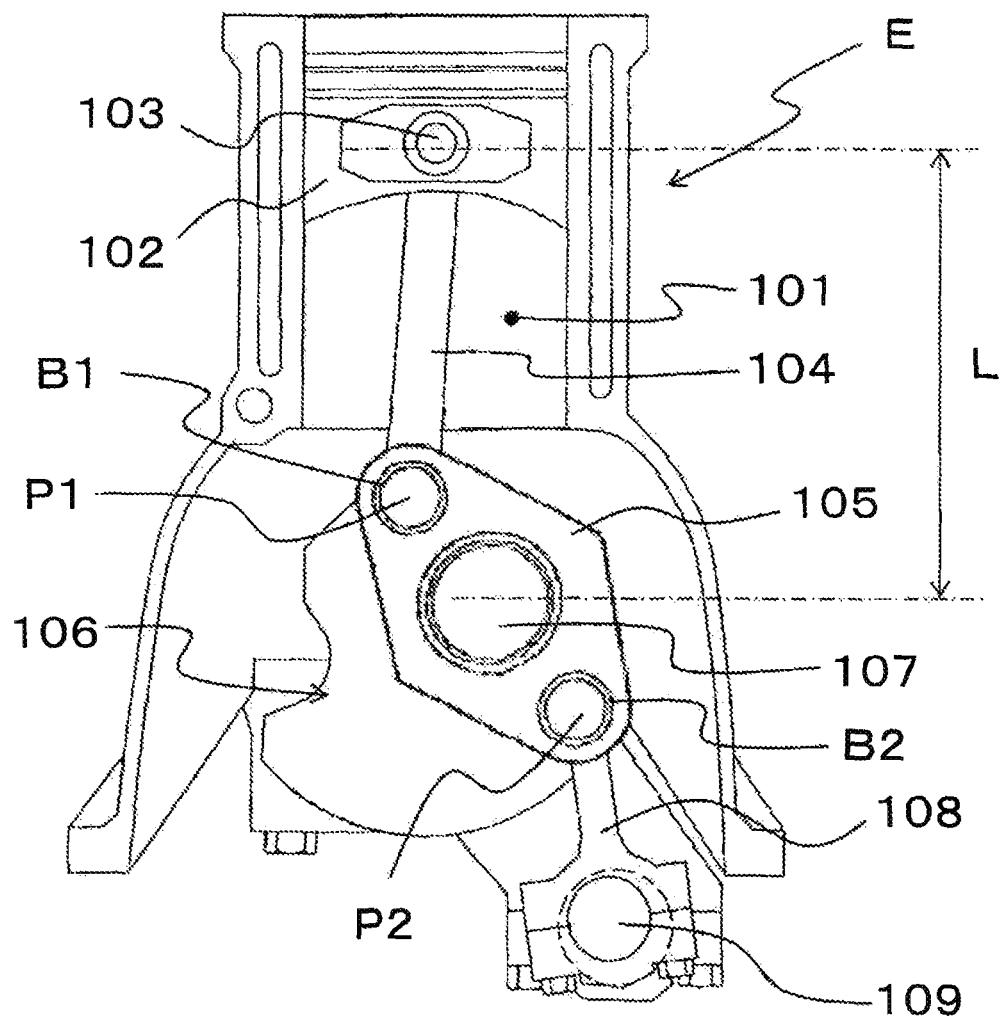
FIG. 1 is a cross-sectional view describing, in a first embodiment of a bearing member according to the present invention, a variable compression ratio engine to which the bearing member can be applied.

FIG. 1 is a cross-sectional view describing a variable compression ratio engine to which the bearing member according to the present invention can be applied. In the illustrated variable compression ratio engine E, an upper end of an upper link 104 is, via a piston pin 103, coupled to a piston 102, which reciprocates within a cylinder 101. The lower end of the upper link 104 is coupled to one end of an intermediate link 105 via a first link pin P1 and a first bushing B1.

A crank pin 107 of a crank shaft 106 is inserted through the center of the intermediate link 105, and the other end of the intermediate link 105 is coupled to an upper end of a lower link 108 via a second link pin P2 and a second bushing B2. The lower end of the lower link 108 is coupled to a control rod 109, and is connected to an actuator (not shown) that causes the control rod 109 to reciprocate in a parallel manner.

The variable compression ratio engine E with the above configuration causes the control rod 109 to move and makes the lower link 108 rotate about the crank pin 107. Thus, the variable compression ratio engine E causes a connecting rod length L (the length from the crank pin 107 to the piston pin 103) to change, and makes a stroke of the piston 102 to vary, to change the compression ratio.

Moreover, in the above variable compression ratio engine E, the first bushing B1 and second bushing B2 provided in the intermediate link 105, and the first link pin P1 and second link pin P2 mounted thereon respectively, repeat sliding contact in combination with the relative reciprocal rotation (swinging) under oil lubrication. Therefore, it is important that these coupled parts have sufficient durability.

The bearing member of the present invention is suitable for the first bushing B1 and second bushing B2 described above. Although the bearing member of the present invention is applicable to members other than the first bushing B1 and the second bushing B2, the following description typically illustrates the first bushing B1 as the bearing member, and the first link pin P1 as a shaft body.

Figure 2:
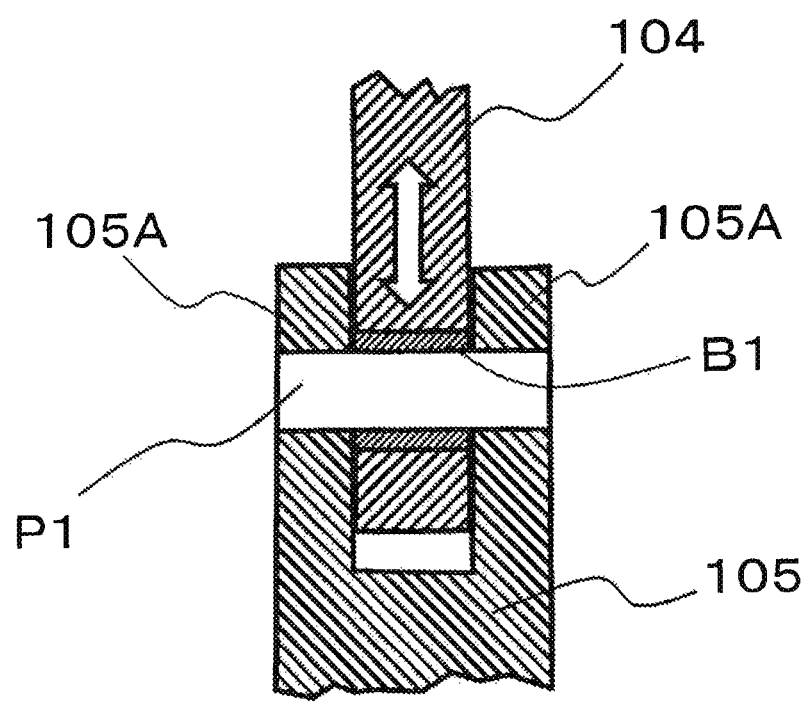
FIG. 2 is a cross-sectional view describing a coupling part between an upper link and an intermediate link, in the variable compression ratio engine shown in FIG. 1.

The first bushing (bearing member) B1 is provided in the upper link 104 as shown in FIG. 2, and is freely rotatable about the first link pin (shaft body) P1 that is integrated with a pair of ribs 105A, 105A of the intermediate link 105.

Figure 3:
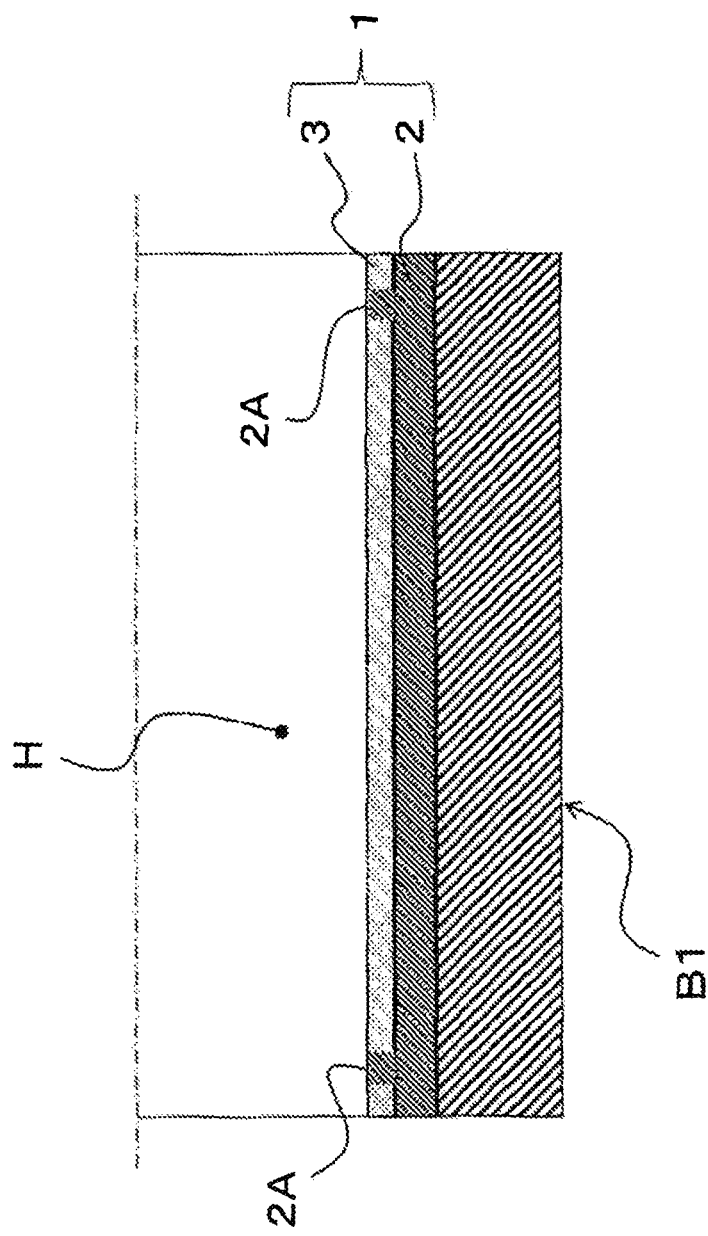
FIG. 3 is a cross-sectional view of the bearing member, omitting one side thereof.

The first bushing B1 has a coating layer 1 on an internal circumferential surface of a shaft hole H in which the first link pin (shaft body) P1 is mounted, as shown in FIG. 3. The coating layer 1 has a metal layer 2 provided on a surface of a backing (bullion) of the first bushing B1 and whose surface is formed unevenly, and a resin layer 3 formed on the metal layer 2.

Furthermore, in the coating layer 1, a part of the metal layer 2 is exposed (exposed part 2A) in a state flush with a surface of the resin layer 3. Namely, on the surface of the coating layer 1, a top part of a protrusion in the uneven form of the metal layer 2 is exposed. This coating layer 1 may have, as a more preferable embodiment, an exposure rate of the metal layer 2 with respect to the surface area of the coating layer 1 of 0.1% or more and 30% or less.

The first bushing B1 is not limited in its material, however is, for example, steel. The metal layer 2 is not limited in its material, however is desirably a material with high heat conduction property, and can be one with a heat conductivity of at least 40 (W/m·K) as a more preferable embodiment. The material of this metal layer 2 is, for example, copper. Moreover, as the metal layer, a metal porous body having a porous structure may be used.

Furthermore, the metal layer 2, as a more preferable embodiment, is one whose Vickers hardness is 80 HV or more. Moreover, the metal layer 2 is one having the Vickers hardness, which is the same as described above or more, and is lower than a Vickers hardness of the first link pin (shaft body) P1 mounted to the shaft hole H. The first link pin P1 is made of carbon steel for example, and more desirably, the one, on whose surface a hard carbon coating film such as diamond-like carbon (DLC) is formed, is used.

The resin layer 3 is not limited in its material, however is desirably one having a small frictional resistance, and is preferably made of at least one resin among polytetrafluoroethylene (PTFE), polyamide imide resin, polyimide resin, polyamide resin, phenol resin, polyacetal resin, polyether ether ketone resin, polyether ketone, polyphenylene sulfide resin, and epoxy resin.

A method of forming the coating layer 1 described above will be described in detail in Examples below; on an internal circumferential surface of the shaft hole H of the first bushing B1, metal powder is fed and is sintered, to form the metal layer 2 of a porous structure with an uneven surface. Next, melted resin is fed on the surface of the metal layer 2 and is hardened, to form the resin layer 3. The resin layer 3 is then grinded on its surface to expose a part of the metal layer 2 (2A) on the surface of the coating layer 1.

Figure 4:
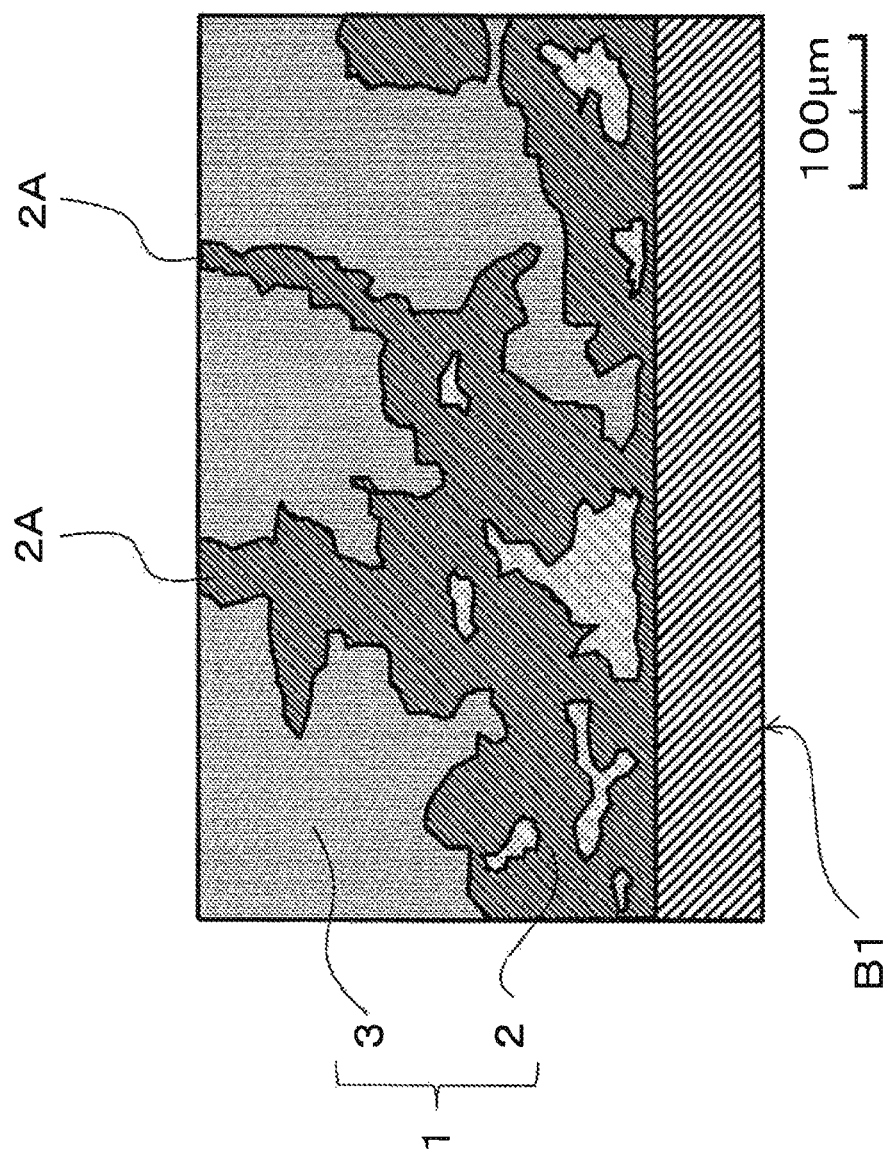
FIG. 4 is a cross-sectional view made on the basis of a micrograph capturing a cross section of a coating layer.

As such, as shown in FIG. 4, the coating layer 1, in which a part of the metal layer 2 is exposed in a state flush with the surface of the resin layer 3, is obtained on the internal circumferential surface of the first bushing B1. In FIG. 3, the thickness of the coating layer 1 is shown exaggerated for convenience, however the actual coating layer 1 has a minute thickness enough to ensure a clearance between the first bushing B1 and the first link pin P1.

In the first bushing (bearing member) B1 with the above configuration, the resin layer 3 that mainly forms the surface of the coating layer 1 reduces the frictional resistance against the first link pin P1, while the metal layer 2, whose part is exposed (2A) on the surface of the resin layer 3, bears the heat conduction. Namely, in FIG. 4, the metal layer 2 extending from the surface of the coating layer 1 to the backing metal (B1) functions as a heat pass. Thus, the first bushing B1 can inhibit the increase in temperature caused by the sliding contact against the first link pin P1, and can accomplish improvement in seizure resistance.

Moreover, the first bushing B1 shown in FIG. 3 has, in a direction along the axis (left-right direction in FIG. 3), the exposed part 2A of the metal layer 2 at least in a range in the vicinity of both end portions. The reason for this is that, when the upper link 104 reciprocates up and down as shown by the arrow in FIG. 2, a bending load is applied on a center portion of the first link pin P1, and in particular, the first link pin P1 partially contacts the vicinity of both end portions of the first bushing B1.

Due to this, with the first bushing B1, the contact pressure with the first link pin P1 in the vicinity of both end portions becomes great, and the temperature easily increases by sliding contact. Accordingly, in the first bushing B1 described above, by positioning the exposed part 2A of the metal layer 2 having high heat conduction property in the vicinity of both end portions, the increase in temperature in the vicinity of both end portions is inhibited, and prevention of seizure is secured more effectively.

Furthermore, in the first bushing B1 described above, by setting the exposure rate of the metal layer 2 with respect to the surface area of the coating layer 1 to be in a range of 0.1% or more and 30% or less, it is possible to accomplish a combination of a function of reducing the frictional resistance by the resin layer 3 and a function of inhibiting the increase in temperature by the metal layer 3.

If the exposure rate of the metal layer 2 is less than 0.1%, heat conduction property of a sufficient degree is impaired and the function of preventing the increase in temperature may become insufficient. Moreover, if the exposure rate of the metal layer 2 exceeds 30%, the function of reducing frictional resistance by the resin layer 3 may become insufficient. Accordingly, the first bushing B1 achieves the combination of the high heat conduction property and low frictional resistance by setting the exposure rate of the metal layer 2 with respect to the surface area of the coating layer 1 within a range of 0.1% or more and 30% or less. Furthermore, the exposure rate of the metal layer 2 is more preferably 1% or more and 20% or less in view of combining the high heat conduction property and the low frictional resistance.

Furthermore, the first bushing B1 described above can further enhance the heat conduction property by the metal layer 2 by making the heat conductivity of the metal layer 2 be 50 (W/m·K) or more. This further inhibits the increase in temperature caused by the sliding contact against the first link pin P1, and can ensure the prevention of seizure more effectively.

Furthermore, the first bushing B1 described above can reduce the frictional resistance and enhance the durability against sliding contact by having the resin layer 3 be made of at least one resin among polytetrafluoroethylene (PTFE), polyamide imide resin, polyimide resin, polyamide resin, phenol resin, polyacetal resin, polyether ether ketone resin, polyether ketone, polyphenylene sulfide resin, and epoxy resin, and is compatible to various used environments depending on the selection of the resin type. Moreover, the resin layer 3 is preferably thermoplastic resin, giving consideration to its moldability.

Furthermore, the first bushing B1 described above can sufficiently reduce the frictional resistance by having the main component of the resin layer 3 be polytetrafluoroethylene (PTFE). Polytetrafluoroethylene is well-known as an excellent low friction material and is known that the friction coefficient and the reduction in friction coefficient are remarkable when the mixed rate is 5 wt % or more.

Furthermore, in the first bushing B1 described above, the metal layer 2 and the resin layer 3 can be easily integrated as one by employing a metal layer 2 made of a metal porous body. This thus enhances the durability of the coating layer 1 and improves the sliding property and high heat conduction property.

Furthermore, in the first bushing B1 described above, the coating layer 1 having the hard metal layer 2 and the resin layer 3 integrated into one and having high adhesion can be formed by the metal layer 2 having a Vickers hardness of 80 HV or more. Furthermore, the first bushing Ba described above has a smaller Vickers hardness for the metal layer 2 than the Vickers hardness of the first link pin P1. Namely, the metal layer 2 can be deformed together with the resin layer 3 by making the metal layer 2 softer than the first link pin P1. Due to this, the first bushing B1 is enhanced in sliding property and high heat conduction property, and also aggression of the first bushing B1 against the first link pin P1 is reduced.

Here, it is more effective to use the bearing member of the present invention in a mechanism that carries out relative reciprocal rotation (reciprocal rotating device) with the shaft body mounted to the shaft hole, under oil lubrication. That is, the first bushing (bearing member) B1 in the variable compression ratio engine E shown in FIG. 1 frequently repeats relative reciprocal rotation with the first link pin (shaft body) P1 mounted to the shaft hole H under oil lubrication, as described above.

For example, in a case in which the hearing member and the shaft body relatively revolves (rotates) in just one direction (rotating device), the feeding and discharging of lubricant oil are smoothly carried out. On the other hand, as with the first bushing B1 described above, in a case in which relative reciprocal rotation is frequently carried out with the first link pin P2, the smoothness in feeding and discharging of the lubricant oil decreases, which may cause insufficient lubricant oil.

In comparison, the first bushing B1 described above reduces the frictional resistance by the resin layer 3 while inhibiting the increase in temperature by the metal layer 2. Therefore, even if the lubricant oil becomes insufficient, the coating layer 1 will cover the insufficient amount of the lubricant oil, thus allowing to prevent seizure.

Second Embodiment

Figure 5:
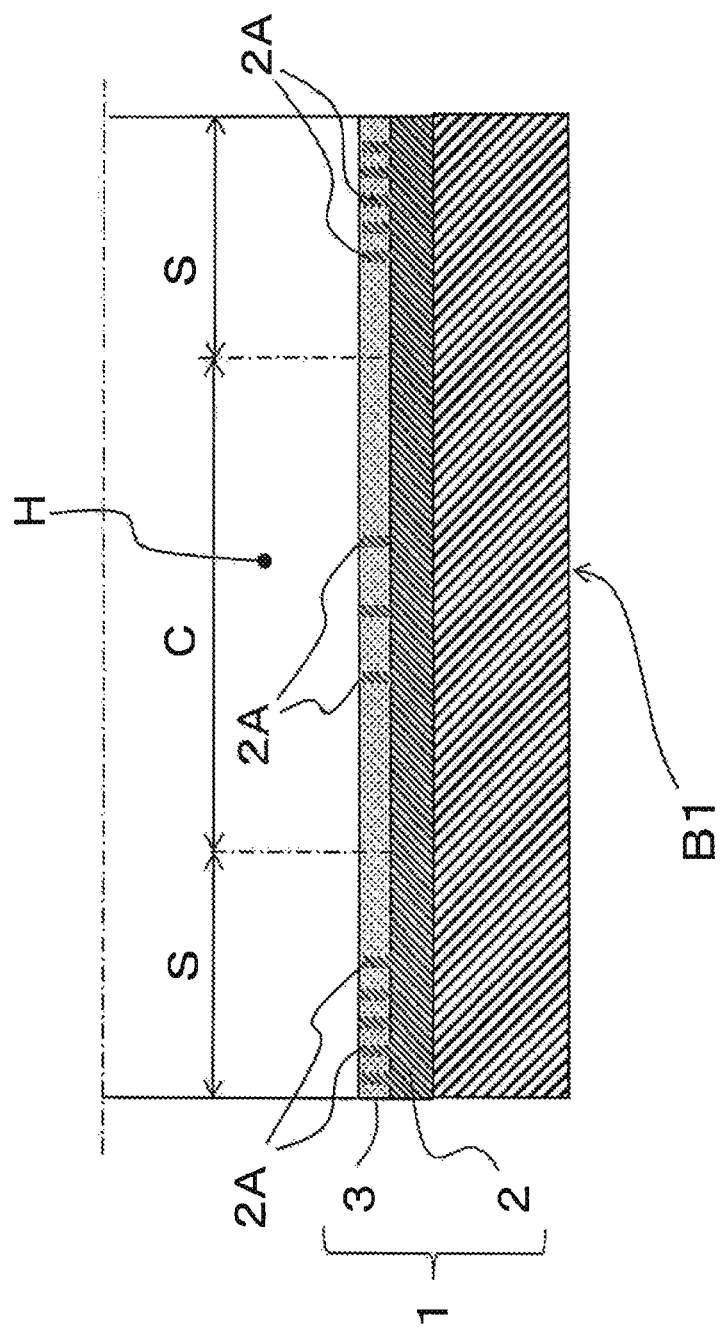
FIG. 5 is a cross-sectional view of the bearing member omitting one side, in a second embodiment of the bearing member according to the present invention.

The first bushing (bearing member) B1 shown in FIG. 5 has a configuration in which, in a direction along an axis of the shaft hole H (left-right direction in FIG. 5), the exposure rate of the metal layer 2 in an end portion (each end) of the shaft hole H is greater than the exposure rate of the metal layer 2 in a center portion C of the shaft hole H. The illustrated metal layer 2 shows the difference in exposure rate by the number of protrusions, however there of course may be the case where the area is different. Here, each end portion S is a region having one fourth of the length of the shaft length of the shaft hole H. Moreover, the center portion C is a region having one half of the length of the shaft length of the shaft hole H.

The temperature of the first bushing B1 easily increases at both of its end portions by sliding contact, in a state that the first link pin P1 is in partial contact with the vicinity of each end portion and the contact pressure is increased, as described in the embodiment before.

Accordingly, in the first bushing B1 described above, the coating layer 1 has the exposure rate of the metal layer 2 at both end portion S larger than the exposure rate of the metal layer 2 at the center portion C to particularly enhance the heat conduction property and inhibit the increase in temperature at the both end portions, thus allowing seizure to be more efficiently prevented.

Third Embodiment

Figure 6:
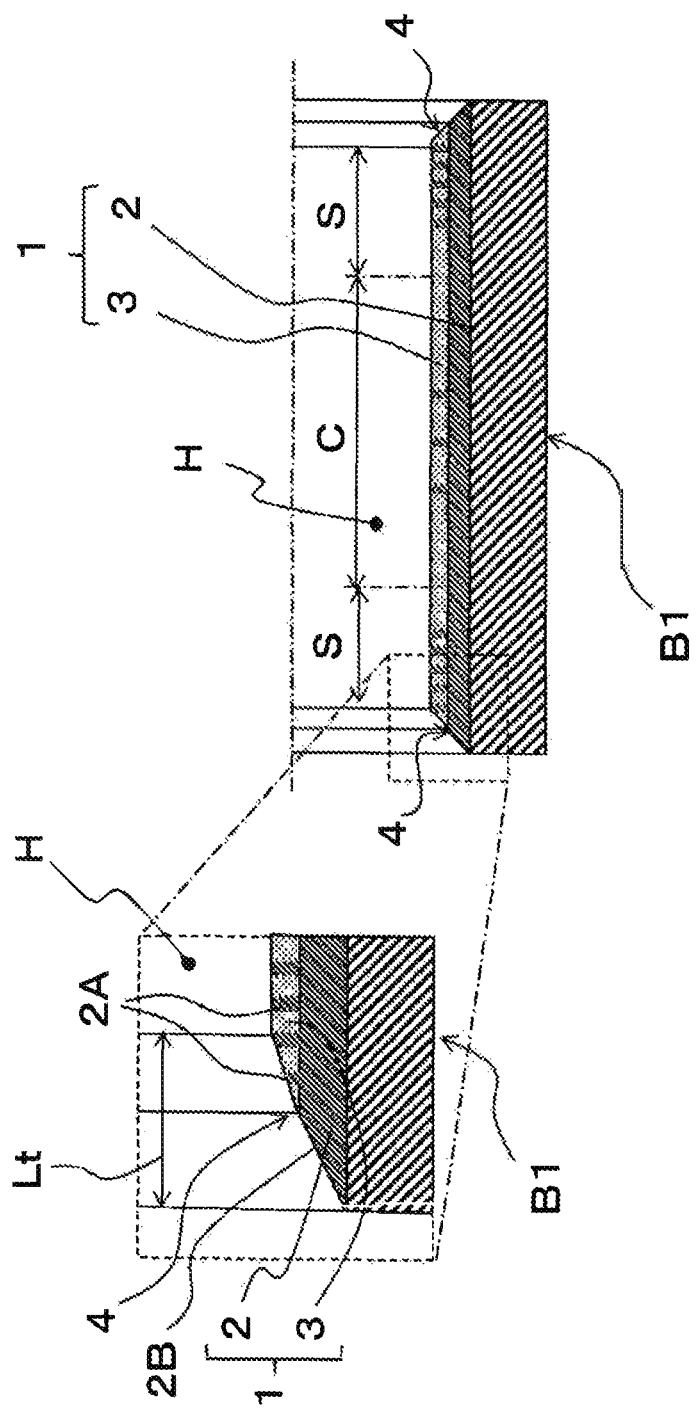
FIG. 6 is a cross-sectional view with an enlarged view of a main part of the bearing member omitting one side thereof, in the second embodiment of the bearing member according to the present invention.

In the first bushing (bearing member) B1 shown in FIG. 6, an inclined portion 4 is provided at the end portions of the shaft hole H in the direction along the axis of the shaft hole H (left-right direction in FIG. 6), the inclined portion 4 gradually enlarges the internal diameter towards the opening. At this time, a length Lt in the axial direction of the inclined portion 4 is 20% or less of the length of the shaft length, and as shown in the enlarged view, a part of the metal layer 2 is exposed (exposed part 2A, 2B) on its internal circumferential surface. Moreover, in the present invention, an embodiment in which a part of the metal layer 2 is exposed on the surface of the resin layer 3 also includes an embodiment made just of the exposed portion 2B formed in the inclined portion 4.

As described above, the drawings show the thickness of the coating layer 1 in an exaggerated manner, and thus the inclined angle of the inclined portion 4 is also shown in an exaggerated manner. The actual coating layer 1 is of a minute thickness enough to ensure a clearance between the first bushing B1 and the first link pin P1, and thus the actual inclined portion 4 is of a minute inclined angle formed within the range of the thickness of the coating layer 1.

Accordingly, the first bushing B1 described above, as with the second embodiment, enhances the heat conduction property at both end portions by the metal layer 2, and the contact pressure with the first link pin P1 is reduced by the inclined portion 4; this hence inhibits the increase in temperature on both end portions further, and allows for more securely preventing seizure. Moreover, the length Lt in the axial direction of the inclined portion 4 was made to be 20% or less of the shaft length since the first link pin P1 partially contacts within that 20% range, and allows for accomplishing the reduction in contact pressure and inhibition of temperature increase within a minimum range.

Figure 7:
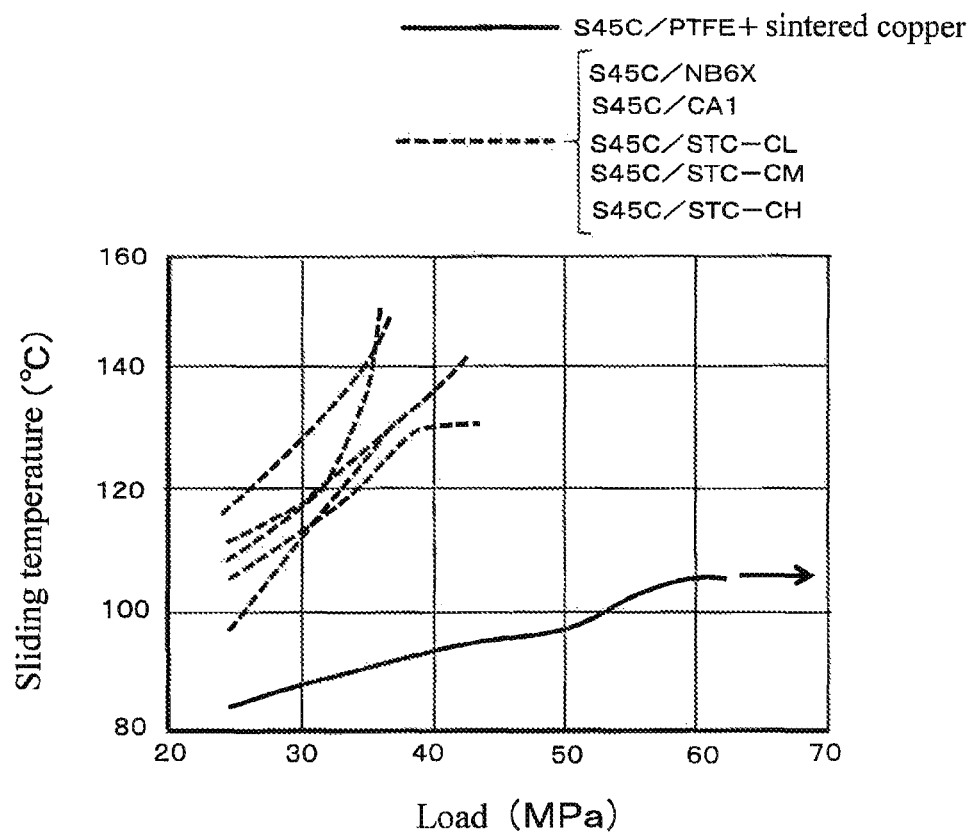
FIG. 7 is a graph showing a relationship between loads and sliding temperatures for the bearing member of the present invention and bearing members for comparison.

FIG. 7 is a graph showing a relationship between load and sliding temperature of the bearing member of the present invention and bearing members for comparison. In FIG. 7, the coating layer of the bearing member of the present invention has a metal layer of a porous structure made by sintering copper powder, and a resin layer whose main component is polytetrafluoroethylene. Moreover, the bearing members for comparison are five types, which form, on the sliding surface, metal coatings made of a copper-based bearing, an aluminum-based bearing, a copper-sintered solid bearing-1, a copper-sintered solid bearing-2, and a copper-sintered solid bearing-3, respectively.

In the test, test strips, in which their respective coating was formed on a metal plate serving as a backing, were prepared as the bearing member, and test strips made of carbon steel (S45C) were prepared as the shaft body. Further, the test strips of the shaft body fixed to a head capable of being lifted and lowered were made into contact with the test strips of the bearing member fixed to a table capable of reciprocal action, and the table was reciprocated. In addition, load (contact pressure) on the test strips of the shaft body was varied, to measure the temperature (contact temperature) of the heat generated on both sliding parts.

All the test strips for comparison shown by the dotted lines in FIG. 7 rapidly increased in sliding temperature together with the increase in load, and resulted in seizure at an early stage. That is, although the test strips for comparison excel in heat conduction property by the metal coating, the friction coefficient (frictional resistance) increased together with the increase in load, and as a result, the sliding temperature increased.

On the other hand, the test strip of the present invention shown by the solid line in FIG. 7 was gradual in the increase in sliding temperature together with the increase in load, as compared to the test strips for comparison. That is, the test strips of the present invention had a low amount of change in the friction coefficient even when the load increased due to the self-lubricating effect of the resin layer, and even further ensured the heat conduction property by the metal layer exposed on the surface of the coating layer. Hence, the sliding temperature is reduced. As such, it can be understood that the bearing member of the present invention excels in the effect of inhibiting temperature increase by the coating layer made of the metal layer and the resin layer.

Figure 8:
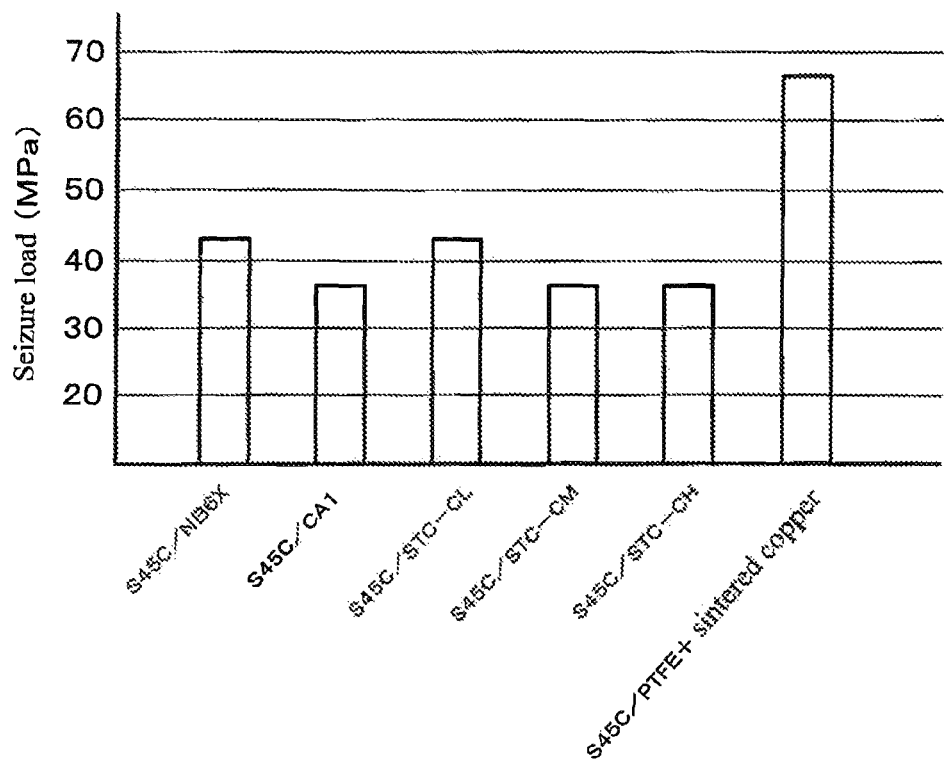
FIG. 8 is a graph showing seizure loads for the bearing member of the present invention and bearing members for comparison.

FIG. 8 is a graph showing seizure loads of the bearing member of the present invention and of the bearing members for comparison. As obvious from FIG. 8, each of the seizure load of the bearing members for comparison is around 40 MPa. In comparison, the seizure load of the bearing member of the present invention is near 70 MPa. It was thus found that the coating layer inhibits the increase in temperature, thereby largely improving the seizure resistance.

EXAMPLES

Copper powder was placed on a surface of a backing (SPCC sheet) having a thickness of 1 mm and plated with copper, then was compacted to have the copper powder have a height of about 150 µm. This compact was heated with an electric furnace at 800° C., to sinter the copper powder and adhere it to the backing, thus forming a metal porous body (metal layer) made of copper. Then, resin (PTFE) was laid on the metal porous body, and the resin was melted at about 400° C. to coat the metal porous body with the resin. Thereafter, the resin was processed to have a height of 50 µm by machine processing, and a part of the metal porous body was made exposed on the surface of the resin layer. Thereafter, by bend processing the backing into a cylindrical shape, a bearing member having a coating layer made of a metal layer and a resin layer (see FIG. 4) was obtained.

Moreover, a reciprocal sliding test that imitates a state in which an oil film breaks was carried out as Examples and Comparative Examples of the present invention. This test, as with the aforementioned test, fixes test strips of the bearing members to a table capable of reciprocal action, test strips of the shaft body are fixed to a head that can be lifted and lowered to make these test strips of the shaft body contact the test strips of the bearing members, and the table is reciprocated; in addition, the load on the test strips of the shaft body is varied.

In the above test, the test strip of the shaft body is of a round shape involving sliding heat generation for all of Examples and Comparative Examples, and a thermocouple is mounted to measure the sliding temperature. The material of the test strip of the shaft body was S45C material, its dimension was curvature R300×30 mm length, and its surface roughness was Ra 0.03 µm. On the other hand, the test strips of the bearing members had a coating layer made of a metal layer of sintered copper and a resin layer whose main component is PTFE, and its dimension was 70 mm×50 mm.

Moreover, in the above test, the movement speed of the table was 1 m/s, the reciprocal range was 20 mm, and the lubrication condition was to apply one droplet of 5w-30GF-4 general-purpose oil. Furthermore, in the above test, the table was heated to 120° C. (high temperature of 160° C.), and a friction force limiter of always exceeding 120N was employed as a test terminating condition.

The test strips of the bearing members of Examples 1 to 5 were made to have different exposure rates of the metal layer on the surface of the coating layer. In particular, Example 3 was made to have a different distribution in exposure rate of the metal layer (see FIG. 5). More specifically, the exposure rate of the metal layer in the center portion (reference sign C in FIG. 5) was made to be 0%, and the exposure rates of the metal layer at each end portion (reference sign S) were made to be 30%. As described above, since the length of the center portion (C) is half of the shaft length, and the length of each end portion (S) is one fourth of the shaft length, the exposure rate of the metal layer on the entire surface of the coating layer is 15%.

In Example 4, inclined portions were provided in the coating layer (see FIG. 6). More specifically, the lengths of the inclined portions in the axial direction were made to be 20% of the shaft length, and furthermore, the metal layer was exposed just in the inclined portions, and the exposure rate of the metal layer was made to be 40%. Since the length of each inclined portion is 20% of the shaft length and the inclined portions occupy 40% of the entire surface of the coating layer, the exposure rate of the metal layer overall is 16%.

In Example 5, in forming the metal layer, a metal layer made of a metal porous body, in which 5.2 wt % of tin (Sn) and 3.4 wt % of nickel (Ni) powder was added to the copper powder was formed, to increase the strength of the metal layer. The heat conductivity of the metal layer, in which tin and nickel was added, was 35 W/m·K. Moreover, the test strip of Comparative Example 1 had a surface of the coating layer of only metal (exposure rate of the metal layer being 100%), and the test strip of Comparative Example 2 had a surface of the coating layer of only resin (exposure rate of the metal layer being 0%).

The exposure rate of the metal layer was calculated by binarizing an image of the coating layer surface from an optical microscopic image enlarging the surface of the coating layer. The heat conductivity of the metal layer was calculated by a laser flash method using a thermal constant measurement device (measured according to "JIS R1611: 2010"). The Vickers hardness of the metal layer was measured using a Vickers hardness tester for the cross section of the metal porous body (measured according to JIS Z 2244). The friction coefficient was calculated by measuring the friction force by a load cell attached to a reciprocal sliding test device, and dividing the friction force by the pressing load.

Furthermore, in the test, for the above Examples 1 to 5 and Comparative Examples 1 and 2, temperatures of the sliding parts were measured within a range of contact load on the test strips of the shaft body from 100N to 2100N, stepping up every 200N per three minutes. The test results of Examples 1 to 5 are shown in Table 1, and the test results of Comparative Examples 1 and 2 are shown in Table 2.

Example 4 is one having the exposure rate of the metal layer concentrated in the inclined portions and having an overall exposure rate of 16%, and achieved a temperature at the sliding part lower than the temperatures of Examples 1 to 3. It was thus confirmed that not only similar effects as

TABLE 1

| | Examples | | | | |
|---|---|---|---|---|---|
| | 1 | 2 | 3 | 4 | 5 |
| Load (N) | 1900 | 1900 | 1500 | 2100 | 1900 |
| Exposure rate of metal layer (%) | 5 | 30 | Center portion: 0 End portion: 30 Overall: 15 | Inclined portion: 40 Overall: 16 | 30 |
| With or without Inclined portion | without | without | without | with inclined portion in each end portion of a length 20% of shaft length | without |
| Heat conductivity of metal layer (W/m · K) | 70 | 70 | 70 | 70 | 35 |
| Sliding part temperature (° C.) | 97.49 | 97.45 | 97.42 | 97.38 | 97.62 |
| Material of metal layer | Copper | Copper | Copper | Copper | Copper + 5.2 wt % Sn + 3.4 wt % Ni |

TABLE 2

| | Comparative Examples | |
|---|---|---|
| | 1 | 2 |
| Load (N) | 1900 | 1100 |
| Exposure rate of metal layer (%) | 100 | 0 |
| With or without Inclined portion | without | without |
| Heat conductivity of metal layer (W/m · K) | 70 | 70 |
| Sliding part temperature (° C.) | 100.51 | 125.55 |
| Material of metal layer | Copper | Copper |

As obvious from Tables 1 and 2, Comparative Examples 1 and 2 both exceed 100° C. in sliding temperature, and in particular, Comparative Example 1 whose coating layer is only metal has no self-lubricating effect by the resin layer, and thus the sliding temperature became high (see FIG. 7). Moreover, since Comparative Example 2 whose coating is only resin has no heat conduction effect by the metal layer, seizure occurred at a state obviously low in contact load. On the other hand, Examples 1 to 5 all had sliding temperatures of 100° C. or less, and the coating layer of the present invention, namely the coating layer, in which a part of the metal layer is exposed on the surface of the resin layer, was confirmed as achieving a temperature increase inhibition effect.

Example 1 has the exposure rate of the metal layer of 5%, Example 2 has the exposure rate of 30%, and both resulted to have similar temperatures at the sliding part. It was thus confirmed that by having the exposure rate of the metal layer with respect to the surface area of the coating layer to be within a range of 0.1% or more and 30% or less, the effects of inhibiting temperature increase and improving seizure resistance by the coating layer were achieved.

Example 3 is one having the exposure rate of the metal layer concentrated in the end portions (reference sign S in FIG. 5) and having an overall exposure rate of 15%, and resulted to have temperatures at the sliding part close to Examples 1 and 2. It was thus confirmed that not only similar effects as Examples 1 and 2 can be obtained, in particular, Example 3 excels in inhibiting temperature increase and improving seizure resistance against the partial contact of the shaft body occurring on the end portions (S), due to the metal layer with the exposure rate concentrated at the end portions (S).

Examples 1 to 3 can be obtained, in particular, Example 4 excels further in inhibiting temperature increase and improving seizure resistance against the partial contact of the shaft body occurring on the ends (S), due to the shape of the inclined portion provided at the end portions (S) combined with the metal layer, in which the exposure rate is concentrated at the inclined portions.

Example 5 is one having the exposure rate of the metal layer of 30%, together with adding tin and nickel to the material (copper) of the metal layer to enhance the strength of the coating layer. Compared to Examples 1 to 4, the temperature of the sliding part increased slightly, however the temperature at the sliding part is obviously lower than Comparative Examples; it was thus confirmed that Example 5 excels in inhibiting temperature increase and improving seizure resistance.

Moreover, friction coefficients in a case in which just the exposure rates of the metal layer were varied were measured, for the above Examples 1 and 2 and additional Example 6 and Comparative Example 3. Example 6 had a metal layer having an exposure rate of 50%. Comparative Example 3 had a surface of the coating layer of only metal (exposure rate of 100%). The results thereof are shown in Table 3.

TABLE 3

| | Example 1 | Example 2 | Example 6 | Comparative Example 3 |
|---|---|---|---|---|
| Load (N) | 1900 | 1900 | 1900 | 1900 |
| Exposure rate of metal layer (%) | 5 | 30 | 50 | 100 |
| Friction coefficient | 0.04 | 0.05 | 0.15 | 0.3 |

As obvious from Table 3, as the exposure rate of the metal layer increases, the friction coefficient increases. Furthermore, it was found that by making the exposure rate of the metal layer be 30% or less, the friction coefficient can be further reduced.

The bearing member according to the present invention is not limited to those of the above-described embodiments in for example the materials of the metal layer and the resin layer, their thicknesses, and distributions in exposure rates of the metal layer, and suitable changes can be made without departing from the features of the present invention. Moreover, although each Embodiment illustrated the first bushing in a variable compression ratio engine as the bearing member, the bearing member may be the actual sliding bearing (bushing) as in the embodiments, or may be various members including the functions similar to the bearing.

REFERENCE SIGNS LIST

B1: First bushing (bearing member)
H: Shaft hole
P1: First link pin (shaft body)
1: Coating layer
2: Metal layer
2A: Exposed part of Metal layer
3: Resin layer
4: Inclined portion

The invention claimed is:

1. A bearing member comprising a coating layer on an internal circumferential surface of a shaft hole configured to mount a shaft body,
wherein the coating layer comprises a metal layer whose surface is formed unevenly, and a resin layer formed on the metal layer, and
a part of the metal layer is exposed on a surface of the resin layer, and
wherein the metal layer has an exposure rate at an end portion of the shaft hole greater than an exposure rate of the metal layer at a center portion of the shaft hole, in a direction along an axis of the shaft hole.

2. The bearing member according to claim 1, wherein, in a direction along an axis of the shaft hole, an end portion of the shaft hole is provided with an inclined portion whose internal diameter gradually enlarges towards an opening, the length of the inclined portion in an axial direction is 20% or less of a shaft length, and a part of the metal layer is exposed on an internal circumferential surface of the inclined portion.

3. The bearing member according to claim 2, wherein the exposure rates of the metal layer with respect to a surface area of the coating layer are 0.1% or more and 30% or less.

4. The bearing member according to claim 3, which is used in a mechanism performing relative reciprocal rotation with the shaft body mounted to the shaft hole, under a lubricant oil.

5. The bearing member according to claim 2, which is used in a mechanism performing relative reciprocal rotation with the shaft body mounted to the shaft hole, under a lubricant oil.

6. The bearing member according to claim 1, wherein the exposure rates of the metal layer with respect to a surface area of the coating layer are 0.1% or more and 30% or less.

7. The bearing member according to claim 6, which is used in a mechanism performing relative reciprocal rotation with the shaft body mounted to the shaft hole, under a lubricant oil.

8. The bearing member according to claim 1, wherein the metal layer has a heat conductivity of 40 (W/m·K) or more.

9. The bearing member according to claim 8, which is used in a mechanism performing relative reciprocal rotation with the shaft body mounted to the shaft hole, under a lubricant oil.

10. The bearing member according to claim 1, wherein the resin layer contains at least one resin among polytetrafluoroethylene (PTFE), polyamide imide resin, polyimide resin, polyamide resin, phenol resin, polyacetal resin, polyether ether ketone resin, polyether ketone, polyphenylene sulfide resin, and epoxy resin.

11. The bearing member according to claim 10, which is used in a mechanism performing relative reciprocal rotation with the shaft body mounted to the shaft hole, under a lubricant oil.

12. The bearing member according to claim 1, wherein the metal layer is made of a metal porous body.

13. The bearing member according to claim 12, which is used in a mechanism performing relative reciprocal rotation with the shaft body mounted to the shaft hole, under a lubricant oil.

14. The bearing member according to claim 1, wherein the metal layer has a Vickers hardness of 80 HV or more.

15. The bearing member according to claim 14, which is used in a mechanism performing relative reciprocal rotation with the shaft body mounted to the shaft hole, under a lubricant oil.

16. The bearing member according to claim 1, wherein the metal layer has a Vickers hardness lower than a Vickers hardness of the shaft body configured to be mounted to the shaft hole.

17. The bearing member according to claim 16, which is used in a mechanism performing relative reciprocal rotation with the shaft body mounted to the shaft hole, under a lubricant oil.

18. The bearing member according to claim 1, which is used in a mechanism performing relative reciprocal rotation with the shaft body mounted to the shaft hole, under a lubricant oil.

* * * * *